United States Patent [19]

Witzel et al.

[11] 4,217,368

[45] Aug. 12, 1980

[54] LONG-LASTING CHEWING GUM AND METHOD

[75] Inventors: Frank Witzel, Spring Valley; Donald A. M. Mackay, Pleasantville, both of N.Y.; Abraham I. Bakal, Parsippany, N.J.; K. Warren Clark, Brewster, N.Y.

[73] Assignee: Life Savers, Inc., New York, N.Y.

[21] Appl. No.: 953,291

[22] Filed: Oct. 20, 1978

Related U.S. Application Data

[63] Continuation-in-part of Ser. No. 903,310, May 5, 1978, abandoned, which is a continuation-in-part of Ser. No. 814,014, Jul. 8, 1977, abandoned.

[51] Int. Cl.$^2$ .............................................. A23G 3/30
[52] U.S. Cl. ........................................ 426/5; 426/548; 426/3
[58] Field of Search ............................. 426/3-6, 426/548

[56] References Cited

U.S. PATENT DOCUMENTS

| | | | |
|---|---|---|---|
| 1,711,281 | 4/1929 | Mowrey | 426/3 |
| 2,301,331 | 11/1942 | Schantz | 426/3 |
| 3,352,689 | 11/1967 | Bilotti | 426/3 |
| 3,795,744 | 3/1974 | Ozawa et al. | 426/3 |
| 3,851,073 | 11/1974 | Cook | 426/3 |
| 4,000,320 | 12/1976 | Klose | 426/3 |

*Primary Examiner*—Jeanette M. Hunter
*Attorney, Agent, or Firm*—Lawrence S. Levinson; Burton Rodney

[57] ABSTRACT

A chewing gum is provided which has long-lasting sweetness and good sweat resistance and includes a water-soluble phase formed of aqueous softener, such as sorbitol syrup, and a first sweetener, such as sorbitol or sugar, in particulate form dispersed throughout the aqueous softener, and a relatively water-insoluble phase formed of a plurality of separate and distinct masses suspended in and dispersed throughout the water-soluble phase, each of said masses formed of particles of gum base and particles of a second sweetener, such as mannitol and/or sorbitol or sugar, enveloped by particles of gum base. The first sweetener and aqueous softener provide the initial impact of sweetness while the gum base provides an envelope or protective vehicle for the second sweetener to control and slow down release of the second sweetener, thereby providing extended sweetness after the initial sweetness impact has subsided.

A method for preparing the above chewing gum is also provided.

35 Claims, 4 Drawing Figures

LONG-LASTING CHEWING GUM AND METHOD

REFERENCE TO OTHER APPLICATIONS

This application is a continuation-in-part of application Ser. No. 903,310, filed May 5, 1978, now abandoned which is a continuation-in-part of application Ser. No. 814,014, filed July 8, 1977, now abandoned.

FIELD OF THE INVENTION

The present invention relates to sugar-containing and sugarless chewing gums which have improved sweetness retention and sweat resistance.

BACKGROUND OF THE INVENTION

Figure 4:
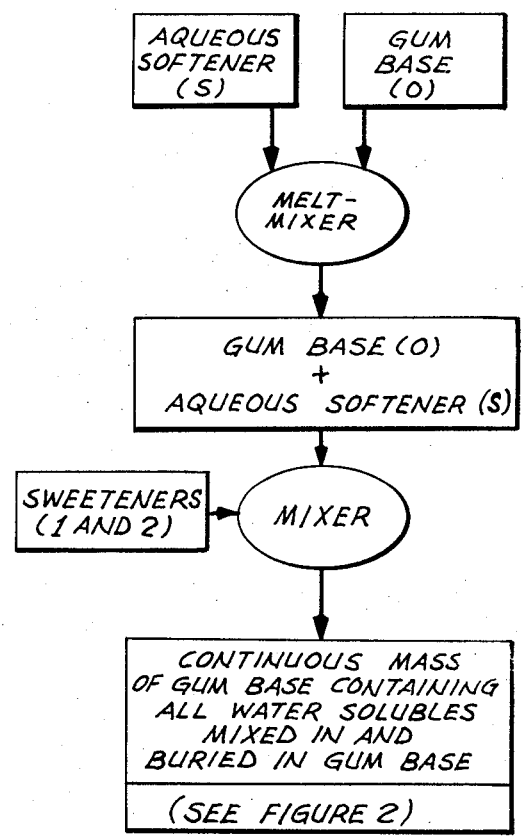
FIG. 4 is a schematic flow diagram illustrating the steps employed in making the prior art chewing gum as shown in FIG. 2.

Conventional chewing gum generally includes gum base to which are added water-soluble sweeteners, for example, various sugars such as sucrose and dextrose, corn syrup, sorbitol and/or artificial sweeteners such as sodium or calcium saccharin, cyclamates, emulsifiers such as lecithin, mono- and diglycerides, and flavors. The chewing gum is generally prepared (as shown in FIG. 4) by melting the gum base (O), mixing corn syrup or other aqueous softener (S) for 3 to 5 minutes with the gum base followed by the addition of solid sweeteners (1) and (2), for example sugar, or sorbitol, and flavor and mixing for 5 minutes. The chewing gum is removed from the kettle, rolled and cut to the desired shape.

Figure 2:
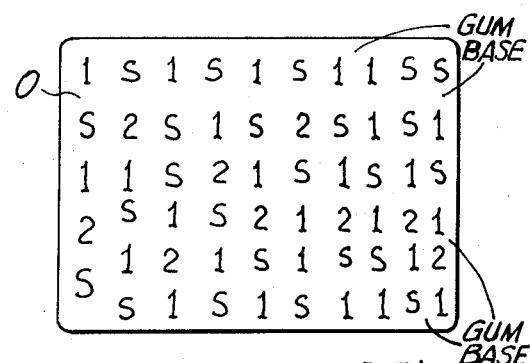
FIG. 2 is a schematic microscopic representation of a portion of a chewing gum similar in composition to the chewing gum shown in FIG. 1 prepared according to conventional methods of manufacture.

As the gum is processed as described above, it remains continuous throughout the entire procedure. The result is that the final chewing gum product is a continuous mass of gum base (O) which envelopes the sugar or other sweeteners (1) and (2) as well as the aqueous softener (S) so as to provide a matrix of gum base (O) containing sweetener (1) and (2) and aqueous softener (S) (see FIG. 2).

The gum so-produced initially provides a desirable strong sweet taste which declines rapidly during the first three to five minutes of chewing to a very slight imperceptible level of sweetness. After about five minutes or less, substantially all sweetness is gone. Accordingly, there clearly is a need for a chewing gum which possesses long-lasting sweetness, that is, sweetness which lasts for seven to eight minutes or longer. Furthermore, a need exists for a long-lasting sugarless gum which contains only natural sweeteners and no artificial sweeteners.

DETAILED DESCRIPTION OF THE INVENTION

Figure 1:
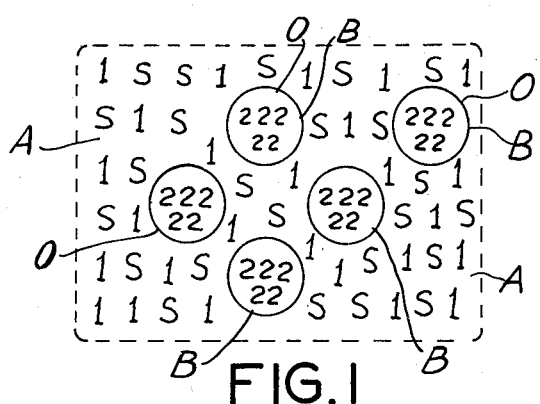
FIG. 1 is a schematic microscopic representation of a portion of the chewing gum of the invention.
Figure 3:
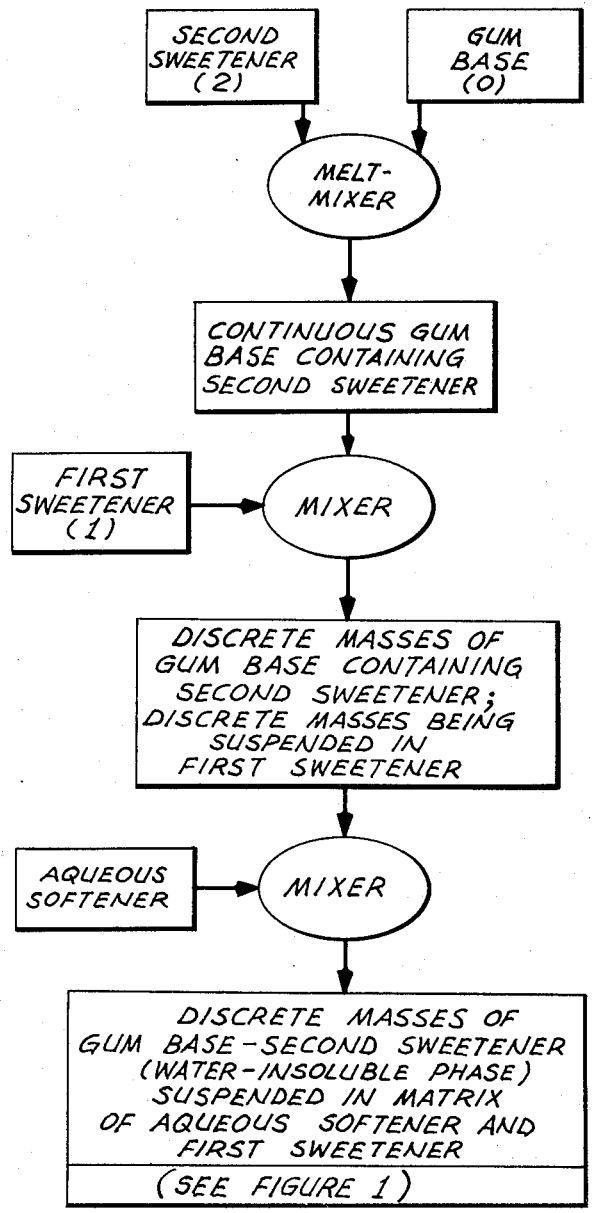
FIG. 3 is a schematic flow diagram illustrating the steps employed in making the chewing gum of the invention as shown in FIG. 1.

In accordance with the present invention, and referring to FIGS. 1 and 3, a chewing gum is provided which has long-lasting sweetness and good sweat resistance and which includes a water-soluble phase (A) formed of aqueous softener (S), such as sorbitol syrup, and a first sweetener (1), such as sorbitol or sugar, in particulate form dispersed throughout the aqueous softener (S); and a relatively water-insoluble phase (B) formed of a plurality of separate and distinct masses suspended in and dispersed throughout the water-soluble phase (A), each of said masses being formed of gum base (O) and particles of a second sweetener (2), such as mannitol and/or sorbitol or sugar, enveloped by particles of gum base. The first sweetener (1) and aqueous softener (S) provide the initial impact of sweetness while the gum base (O) provides an envelope or protective vehicle for the second sweetener (2) to control and slow down release of the second sweetener, thereby providing extended sweetness after the initial sweetness impact has subsided.

It has now been found that the sweetness of chewing gum can be prolonged by incorporating particulate sweetener (that is, the second sweetener as referred to above) in the gum base in a manner such that particles of the second sweetener are dispersed in, enveloped by, trapped in and/or otherwise protected by the gum base so that solubilization of the second sweetener in any of the later added chewing gum ingredients will be held to a minimum. This may be accomplished by incorporating the particles of second sweetener in melted gum base prior to mixing the gum base with plasticizers, aqueous softeners, moisturizers, additional sweeteners or any other material in which the (second) sweetener dispersed in the gum base may be soluble.

The second sweetener so-dispersed and sealed in the gum base is substantially retained in the gum base and not readily solubilized therefrom during chewing, but undergoes only slow and controlled release into the saliva. This is distinct from conventional chewing gum manufacture wherein sweetener, such as sugar or sorbitol or other sweetener is normally added to gum base after corn syrup, sorbitol syrup, or other aqueous softeners have been added; the aqueous softeners cause solubilization of the sweetener from the gum base with the result that the sweetness is practically exhausted after only 3 to 5 minutes of chewing.

The chewing gum of the invention may be provided with an initial burst of sweetness by admixing an auxiliary or first sweetener, which may be a second portion of the second sweetener, and/or other sweetener, with the gum base (containing the second sweetener already dispersed therein). As the mixing progresses the gum base containing the second sweetener dispersed therein is torn apart into discrete masses and suspended in the first sweetener. Thereafter, plasticizer or aqueous softener in the form of a polyhydric alcohol-type syrup is admixed with the discrete masses suspended in the first sweetener, thereby imparting a unique, soft nougat-like structure which allows for a good initial burst of sweetness and flavor and excellent extended sweetness duration of up to 8 minutes or more with good sweat resistance.

It will be appreciated that the first or auxiliary sweetener added to the gum base already containing the second sweetener interdispersed therein will not impart the prolonged sweetness to the chewing gum, but is only present for initial sweetness impact; prolonged sweetness is attained only through the second sweetener which is initially separately interdispersed and sealed in the gum base.

Thus, as seen herein, the present invention provides both sugar-containing and sugarless chewing gums having long-lasting sweetness. Furthermore, the present invention provides long-lasting sugarless chewing gums which need not contain artificial sweetness but may include only natural sweeteners, such as sorbitol, mannitol and/or xylitol and the like; the "natural" sugarless chewing gum provides long-lasting sweetness without the need for saccharin due to its unique structure and process of manufacture.

The term "first sweetener" or "auxiliary sweetener" as employed herein refers to the sweetener initially extracted upon chewing and which forms a water-soluble phase with the aqueous softener.

The term "second sweetener" as employed herein refers to the sweetener which is only slowly extracted primarily after the first sweetener has been solubilized upon chewing; the second sweetener together with the gum base forms a water-insoluble phase or a phase which is slowly released during chewing.

In carrying out the method of the invention (as seen in FIG. 3), the gum base is first melted, emulsifier such as lecithin and the second sweetener are thoroughly mixed, for at least two minutes, in the melted gum base (which is maintained at a temperature preferably not exceeding 200° F.) to effect uniform distribution and seal the second sweetener in the gum base. Flavors, food acids (where desired) are added and the mixture is mixed for from 1 to 2 minutes. The mix, at this time, is a continuous cohesive mass. At this stage the auxiliary or first sweetener, preferably in particulate form, which may be another portion of the same sweetener as the second sweetener, or other sweetener, is added to the continuous mass with mixing being continued for from 1 to 5 minutes, thereby causing the continuous mass to be torn apart into discrete, separate masses of gum base containing second sweetener sealed therein said discrete masses being suspended in particles of first sweetener to form a heterogeneous mass. The aqueous plasticizer or softener is added to and mixed with the heterogeneous mass for from 1 to 5 minutes, and preferably from 1 to 3 minutes. Thereafter, the solid flavor, for example, encapsulated or fixed on dextrin or gum arabic, and water-soluble acids may be added and mixed with the gum mass to form a smooth chewing gum which may be rolled, scored and cut into desired shapes.

It will be appreciated that when the aqueous plasticizer or softener is added after the mix is in discontinuous discrete masses or clumps containing second sweetener sealed therein and suspended in the auxiliary or first sweetener, substantially all water from the aqueous plasticizer, such as sorbitol syrup, will be taken up by the water-soluble particulate auxiliary or first sweetener, and the water will not be available for solubilizing the second sweetener sealed in the gum base. The second sweetener initially added to the melted gum base to form a continuous mass will be substantially buried in the gum base and protected from any solubilization (for example, due to aqueous polyol syrup) even after the gum base mix is torn into discrete masses or clumps. Thus, the present invention provides a chewing gum and method for making the same wherein long-lasting sweetness is obtained without the need for coating, encapsulating, and/or integrating water-soluble polymeric substances, such as polyvinyl esters on to the particles of sweetener and without affecting the initial sweetness impact.

Examples of the second sweeteners which may be employed herein and interdispersed throughout and sealed in discrete masses of gum base to provide prolonged sweetness include, but are not limited to, one or more of the following: natural sweeteners, such as sucrose, glucose, fructose, fructose syrup, glycyrrhizin, molasses, caramel, monoammonium salt of glycyrrhizin, mono-, di- or tri-sodium salt of glycyrrhizin, mono-, di- or tri-potassium salt of glycyrrhizin, and calcium salt of glycyrrhizin; sugar alcohols, such as mannitol, sorbitol, xylitol, maltitol; artificial sweeteners, such as calcium saccharin, sodium saccharin, free acid form of saccharin, ammonium saccharin, aspartame (L-aspartyl-L-phenylalanine methyl ester), naringin dihydrochalcone, neohesperidin dihydrochalcone, cyclamic acid, sodium cyclamate, calcium cyclamate, *Dioscoreophyllum cumminsii* (Serendipity Berry), *Stevia rebaudiana* (Stevioside), *Richardella dulcifica* (Miracle Berry), or thaumatin, with sucrose, mannitol and/or sorbitol being preferred.

The first (auxiliary) sweetener employed with the aqueous softener for initial sweetness impact will preferably be easily extractable from the chewing gum and may include one or more of the following: natural sweeteners, such as sugars, sugar alcohols, such as, xylitol, sorbitol, mannitol, maltitol, or mixtures thereof, or sugar containing materials, for example, monosaccharides, such as arabinose, xylose, ribose, glucose, mannose, galactose, fructose, dextrose, or sorbose or mixtures of two or more of the foregoing monosaccharides, disaccharides, such as, sucrose, for example, cane or beet sugar, lactose, maltose or cellobiose; and polysaccharides; artificial sweeteners, such as the free acid form of saccharin, calcium saccharin, ammonium saccharin, sodium saccharin, aspartame (L-aspartyl-L-phenylalanine methyl ester), naringin dihydrochalcone, neohesperidin dihydrochalcone, cyclamic acid, sodium cyclamate and calcium cyclamate, as well as other sweeteners such as *Dioscoreophyllum cumminsii* (Serendipity Berry), *Stevia rebaudiana* (Stevioside), *Richardella dulcifica* (Miracle Berry), thaumatin and the like.

The plasticizer or aqueous softener, which together with the first sweetener forms the so-called water-soluble phase of the chewing gum (as opposed to the oil- or water-insoluble gum base-phase which includes the second sweetener dispersed therein) will preferably take the form of a substantially non-hygroscopic material such as a polyhydric alcohol in liquid form (xylitol syrup, sorbitol syrup, maltitol syrup or hydrogenated starch hydrolysates such as disclosed in U.S. Reissue Pat. No. 26,959 and U.S. Pat. No. 3,556,811).

The aqueous softener will be employed in an amount so that the gum base:softener weight ratio will be 0.3:1 or greater.

A thickener may be employed in conjunction with the aqueous softener in an amount within the range of from about 0.1% to about 20%, and preferably from about 3% to about 10% by weight of the finished chewing gum. Examples of suitable thickeners include hydrolyzed cereal solids, malto-dextrin, modified food starch, low D.E. corn syrup solids, alginates, carrageenan, xanthan gum, gelatin carob, tragacanth, locust bean, and other water-soluble gums, and carboxymethyl cellulose.

Malto-dextrin is particularly preferred and may be used in amounts to provide a weight ratio to the aqueous softener ranging from about 2:1 to about 1:1. The addition of the above results in increased body and strength of the aqueous softener which may be necessary for efficient sheeting of the gum.

The aqueous softener or plasticizer employed herein serves as a matrix which surrounds the islands of gum base containing the second sweetener and functions as a binder for such islands of gum base-second sweetener, and the particles of first sweetener. Inasmuch as the aqueous softener (or binder) lies on the gum surface (in effect coating the masses or islands of gum base), it is preferred that the hygroscopicity of the aqueous softener be as low as possible. Thus, corn syrup which is highly hygroscopic and will readily absorb moisture causing sweating problems in hot, humid climates, is to be avoided where possible. It is preferred that the aqueous softener employed herein even in sugarbased gum be sorbitol syrup.

The aqueous softener (or binder) will contain from about 65 to about 80% and preferably from about 70 to about 75% by weight solids and will be present in an amount from about 3 to about 30% and preferably from about 5 to about 25% by weight of the chewing gum depending upon the type and amount of sweetener solids present in the softener.

The amount of gum base present will vary depending upon the configuration of the chewing gum product and the type of sweeteners present therein. The gum base should be present in quantities sufficient to make balanced formulas which produce gum which is sufficiently discontinuous to have desirable nougat-like sweetness-flavor release properties, yet at the same time sufficiently continuous to allow for processibility into desired shapes or forms.

In the case of sugar-containing chewing gum, the water-soluble phase (aqueous softener-first sweetener) will usually comprise from about 23 to about 80% and preferably from about 30 to about 50% by weight of the chewing gum, the water-insoluble phase (gum base-second sweetener) will comprise from about 20 to about 75% and preferably from about 30 to about 70% by weight of the chewing gum. The first sweetener (dispersed in the aqueous softener) as described above will usually be present in an amount from about 20 to about 60% and preferably from about 25 to about 35% by weight, and the second sweetener which may be sugar or other sweetener will be present in an amount within the range of from about 20 to about 45% and preferably from about 25 to about 35% by weight of the chewing gum.

In the case of sugarless chewing gums, the water-soluble phase will usually comprise from about 50 to about 92% and preferably from about 55 to about 88% by weight of the chewing gum, whereas the water-insoluble phase will comprise from about 8 to about 50% and preferably from about 12 to about 48% by weight of the chewing gum.

The first sweetener (dispersed in the aqueous softener) as described above (for example, a sugar alcohol) will be present in an amount from about 25 to about 35% and preferably from about 28 to about 32% by weight, and the second sweetener which may be a sugar alcohol or other non-sugar sweetener will be present in amount within the range of from about 15 to about 35% and preferably from about 28 to about 32% by weight of the chewing gum.

Where artificial sweeteners are employed in the chewing gum of the invention, whether it be in the water-insoluble gum base phase or in the water-soluble aqueous softener phase, the artificial sweetener will be employed in each in amounts generally used in sugarless gums depending upon the type of artificial sweetener employed. Thus, the artificial sweetener may be employed in either or both phases in amounts ranging from about 0.02 to about 1% by weight of the chewing gum product.

It has been found that by controlling gum base concentration in the chewing gum product of the invention, it is possible to optimize sweetener release properties from the chewing gum and thereby maximize the sweetener concentration in the saliva. This is accomplished by decreasing the concentration of gum base so that a short nougat-type structure is obtained. The short nougat-type structure is easily torn apart on chewing releasing large amounts of sweetener into the saliva. Thus, in accordance with the present invention, the gum base will be present in amounts ranging from about 8 to about 25% by weight of the chewing gum, and preferably from about 12 to about 20% in the case of non-stick shaped chewing gum, for example cubes, pillows, balls, blocks, and the like, which optionally may include a sugar or sugarless coating or shell.

Where an outer shell is desired, it may be applied to the chewing gum employing coating techniques well known in the art. The coating or shell may contain corn syrup, dextrose and/or other conventional coating ingredients and may comprise from about 10 to about 20% and preferably from about 12 to about 15% by weight of the final chewing gum product. The coating not only provides additional flavor and sweetness to the chewing gum but also protects the soft gum center and improves overall shelf-life of the gum.

In the case of chewing gum having a stick configuration, because of processing considerations, larger gum base concentrations may be necessary, preferably from about 18 to about 24% by weight of the chewing gum. Thus, chewing gums in accordance with the present invention having stick configurations will not have the short nougat-type structure associated with the aforedescribed non-stick chewing gums because of the increased gum base concentrations required in such stick gums.

As gum base concentration is reduced, the total sweetness of the chewing gum of the invention increases. However, notwithstanding increased sweetness-flavor release, it is essential that cud volumes be maintained at acceptable levels, especially in bubble type gums. If the cud volume is too low, the resulting gum may be tiresome to chew; in bubble gum form, a small cud makes it almost impossible to blow bubbles using only one stick of gum.

Surprisingly, it has been found that satisfactory cud sizes or volumes may be maintained by incorporating mannitol into the chewing gum of the invention, preferably as the second sweetener or together with another (second) sweetener so that the mannitol is dispersed and sealed in the gum base as described above. The mannitol being only a poorly-soluble sugar alcohol is slow to extract from the gum base and increases the weight and size thereof. In addition, mannitol apparently has the ability to attract water (saliva) into the cud (gum base) thereby increasing its volume and size. In the case of bubble gum containing low amounts of gum base, the presence of mannitol enables bubbles to be blown even using only one stick of gum for the chew. Furthermore, unlike other gum components, mannitol can be tolerated in the bubble gum cud as it will not interfere with the blowing of bubbles, whereas with other sugars and sugar alcohols nearly complete extraction is necessary before the cud becomes suitable for blowing bubbles.

Generally, the lower the gum base concentration, the higher the mannitol concentration required to obtain preferred cud volumes. Amounts of mannitol necessary to produce desired cud volumes will vary from about 10 to about 50% and preferably from about 15 to about 35% by weight in the case of sugarless bubble gums, from about 10 to about 50% and preferably from about 15 to about 35% in the case of sugarless gums, from about 5 to about 30% and preferably from about 10 to about 20% by weight in the case of sugar-containing bubble gums, and from about 5 to about 30% and preferably from about 10 to about 20% by weight in the case of sugar-containing gums.

The use of mannitol in the chewing gum of the present invention having the unique nougat structure has surprisingly resulted in the extension of sweetness in such gum. For example, in the case of sugarless gum of the invention, the presence of mannitol in conjunction with sorbitol as the second sweetener, dispersed in and sealed in the gum base, produces a chewing gum which is more sweet that a chewing gum containing sorbitol and no mannitol. This is indeed surprising inasmuch as mannitol itself is barely sweet while sorbitol is more sweet than mannitol; thus one would normally expect that the use of barely sweet mannitol to replace a substantial part (for example, from 10 to 50%) of the not-very-sweet sorbitol would result in a perceptibly less sweet mixture. In practice, the opposite is found; the sweetness perception is increased and the flavor duration is increased in spite of the decreased totality of sweetness in the standard size and weight piece of chewing gum. Similar results are achieved in the case of sugar-containing gums wherein mannitol is employed to replace a portion of the sugar (employed as the second sweetener buried in the gum base).

The unique nougat structure of the invention is especially suitable in bubble gum manufacture. The bubble gum produced in accordance with the present invention will be formed of discrete and separate masses of gum base floating or being suspended in the aqueous softener. The fact that the gum base is broken apart during manufacture destroys the elasticity of the gum base thereby reducing snapback and resiliency so that proper length and thickness stability can be maintained for processing on high speed wrapping equipment. Thus, the chewing gum of the invention allows for processing on stick equipment within extremely tight tolerances.

Preferred are the following formulations:

| | Sugar-containing | | |
|---|---|---|---|
| | | Range % By Weight of Chewing Gum | |
| | | Stick | Other (Blocks) |
| A. | Water-soluble phase | | |
| | Sorbitol syrup (% solids 68 to 72) | 3–10 | 8–12 |
| | Sugar | 28–32 | 28–32 |
| B. | Water-insoluble phase | | |
| | Gum base | | |
| | Bubble gum | 20–25 | 12–20 |
| | Regular | 20–25 | 12–20 |
| | Sugar | 28–32 | 28–32 |

| | Sugarless | | |
|---|---|---|---|
| | | Stick | Other (Blocks) |
| A. | Water-soluble phase | | |

-continued

| | | | |
|---|---|---|---|
| | Sorbitol | 25–35 | 25–35 |
| | Sorbitol syrup (% solids 68 to 72) | 18–30 | 18–30 |
| B. | Water-insoluble phase | | |
| | Gum base | | |
| | Bubble gum | 18–25 | 12–20 |
| | Regular | 18–25 | 12–20 |
| | Mannitol or sorbitol | 20–30 | 20–30 |

Conventional chewing gum provides initially a very strong sweet taste which declines very rapidly in the first 3 to 5 minutes of chewing to an imperceptible level of sweetness. The chewing gum of the present invention, on the other hand, which contains the second sweetner incorporated and sealed in the gum base (prior to adding the polyhydric alcohol or other aqueous plasticizer to the gum base), as well as conventional bulking agents, sweeteners, etc., provides a chewing gum whose initial sweetness is even higher than that of conventional gum for the first 3 minutes and, thereafter, begins to drop more slowly and stabilizes after about 5 minutes of chewing at a desirable sweetness level. This sweetness level remains essentially stable for 8 minutes or more of chewing. In the chewing gum of the invention, during the first few minutes of chewing, the perceived sweetness is due only to the first sweetener, namely, sugars or sugar alcohols, or other soluble sweeteners (not combined with the gum base). Thereafter, the second sweetener combined in the masses of gum base is released, flavor is stabilized and the sweet taste persists for extended periods of chewing of up to 8 minutes or more.

In view of the above, it will be appreciated that by incorporating the second sweetener in the gum base, in accordance with the invention, the initial sweetness impact of the second sweetner is reduced or delayed. Thus, the second sweetener incorporated in the gum base may be used in sugar- or sugar alcohol- or other natural- or artificial-sweetener-containing chewing gums where a second burst of sweetness is desired.

Where the chewing gum of the invention is to include a natural sweetener such as sugar or sorbitol or mannitol, the natural sweetener will be added to the melted gum base (prior to adding polyhydric alcohol plasticizer or other materials in which the natural sweetener is soluble) in an amount within the range of from about 10 to about 80% and preferably from about 15 to about 60% by weight of the total natural sweetener concentration in the chewing gum.

In forming the gum base combination with natural sweetener (as the second sweetener), the gum base material will be employed in a weight ratio to the natural sweetener of within the range of from about 1.8 to about 0.45 and preferably from about 0.9 to about 0.6 so as to provide a concentration of natural sweetener buried in the gum base within the range of from about 55 to about 250% by weight of the gum base, and preferably from about 110 to about 200% by weight of the gum base.

In preparing the second sweetener-gum base combination, it is preferred that powdered sweetener (or perhaps even liquid sweetener) be employed to expedite dispersion or dissolution in the gum base. However, larger particle sizes may be used if the mixing time is increased to effect solubilization or milling during the mixing operation. A mixing time of no less than 2 (and preferably about 3) minutes will be employed to effect a uniform distribution of the sweetener in the gum base when conventional chewing gum sigma blade mixers are used. However, this mixing time may be shortened if more efficient mixing methods are employed.

In general, the gum base is prepared by heating and blending natural gums, synthetic resins, waxes, plasticizers, etc., in a manner well known in the art. Typical examples of the ingredients found in a chewing gum base are masticatory substances of synthetic origin such as styrene-butadiene copolymer, isobutyleneisoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum.

Other conventional ingredients which may be present in the gum base include a hydrophilic-type detackifier which will sorb saliva and become slippery and is incompatible with the elastomer and solvent for the elastomer, such as polyvinyl acetate, polyvinyl butyl ether, copolymers of vinyl esters and vinyl ethers.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like.

The gum base may also include a softening agent and lubricant combination which may comprise one or more hydrogenated vegetable or animal fats having a high melting point, that is above about 22° C.

The gum base will also include an emulsifier to impart hydrophilic properties to the gum base so that saliva will be absorbed thereby making the gum base slippery. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to about 1000 ppm of the gum base, such as butylated hydroxytoluene, butylated hydroxyanisole, and/or propyl gallate.

The gum base may also contain particles of chalk ($CaCO_3$) as a bulking agent and texturizer in amounts ranging from about 0 to about 75%, and preferably from about 0.2 to about 25% by weight of the gum base. However, where the gum base is to be employed in a substantially calorie-free gum, the gum base may include from about 32 to about 75% and preferably from about 35 to about 70% by weight texturizing agent or inert filler. Examples of texturizing agents or inert fillers suitable for use herein include calcium carbonate, aluminum hydroxide, alumina, magnesium carbonate, talc, aluminum silicates and mixtures thereof. In addition, the gum base may be mixed with artificial sweeteners and/or food acids as set out herein to provide initial burst of sweetness or sourness and/or prolongation of sweetness.

The water-insoluble gum base may consist of any of the various bases disclosed for example in U.S. Pat. Nos. 3,052,552 and 2,197,719.

The chewing gum of the invention may include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives. The above flavors may be added with the aqueous softener and be a part of the water-soluble phase and/or added with the second sweetener to the gum base and be a part of the so-called water-insoluble phase.

In order to provide an initial taste or sensation of sourness, the chewing gum of the invention may also contain food acid such as citric acid, tartaric acid, malic acid, and the like, in an amount ranging from about 0.3 to about 2.0% by weight, and preferably from about 0.5 to about 1.2% by weight of the final gum product. Such food acid may be added to the gum with the aqueous softener or water-soluble phase, in order to facilitate initial sourness. In addition, insoluble acids such as fumaric or encapsulated soluble acids may be added with the second sweetener and buried in the gum base in order to sustain lasting sourness.

The following Examples illustrate preferred embodiments of the invention.

EXAMPLE 1

An orange-flavored chewing gum of the following composition, in accordance with the present invention, is prepared as described below.

|  | Parts by Weight |
|---|---|
| Gum base | 37 |
| Sugar (dispersed in melted gum base) | 52 |
| (mixed with cooled gum base) | 52 |
| Sorbitol (liquid) | 14 |
| Liquid orange flavor | 1 |
| Spray dried orange flavor | 0.9 |
| Maltrin M100 (corn syrup solids thickener-DE 9-12, Grain Processing Corp., Iowa) | 8.5 |
| Citric Acid | 0.9 |
| Fumaric acid | 4 |

The gum base is added to a steam jacketed kettle equipped with a sigma blade mixer. The base is melted and adjusted to a temperature of about 180° F. to 200° F.

About one-half of the sugar is thoroughly mixed into the melted gum base (while the gum base is folding well) for about 3 minutes to disperse the sugar throughout the continuous mass of gum base. The sugar is thereby trapped in or otherwise protected by the gum base.

Thereafter, the fumaric acid is added with mixing for about 30 seconds, and the liquid flavor is added with mixing for about 1 minute. The remaining sugar is added with mixing for about 2 minutes thereby causing the mass to be torn apart into discrete pieces. The Maltrin M100 and liquid sorbitol are added to the discrete pieces of gum base with mixing for about 2 minutes, and the citric acid and spray dried flavor are added with mixing for about 2 minutes. The mass, now smooth and continuous, is removed from the kettle, rolled, scored and cut into chewing gum sticks.

EXAMPLE 2

A lime-flavored chewing gum of the following composition, in accordance with the present invention, is prepared in a manner similar to that described in Example 1.

|  | Parts by Weight |
|---|---|
| Gum base | 37 |
| Sugar (dispersed in melted gum base) | 52 |
| (mixed with cooled gum base) | 52 |
| Sorbitol (liquid) | 14 |
| Lime oil | 21 |
| Spray dried flavor lime | 4 |
| Maltrin M100 | 8.5 |
| Citric acid | 0.9 |
| Fumaric acid | 4 |

EXAMPLE 3

A lemon-flavored chewing gum of the following composition, in accordance with the present invention, is prepared in a manner similar to that described in Example 1.

|  | Parts by Weight |
|---|---|
| Gum base | 37 |
| Sugar (dispersed in melted gum base) | 51 |
| (mixed with cooled gum base) | 51 |
| Sorbitol (liquid) | 14.5 |
| Lemon oil | 2 |
| Spray dried lemon flavor | 2 |
| Maltrin M100 | 8.6 |
| Citric acid | 0.9 |
| Fumaric acid | 4.3 |

EXAMPLE 4

A cherry-flavored chewing gum of the following composition, in accordance with the present invention, is prepared in a manner similar to that described in Example 1.

|  | Parts by Weight |
|---|---|
| Gum base | 37 |
| Sugar (dispersed in melted gum base) | 51 |
| (mixed with cooled gum base) | 51 |
| Sorbitol liquid | 14.5 |
| Cherry oil | 1.5 |
| Spray dried cherry flavor | 3.5 |
| Maltrin, M100 | 8.6 |
| Citric acid | 0.9 |
| Fumaric acid | 4.3 |

EXAMPLE 5

A xylitol-sugar sweetened chewing gum having the following composition, in accordance with the present invention, is prepared as described below.

|  | Parts by Weight |
|---|---|
| Gum base | 20 |
| Sugar (dispersed in melted gum base) | 30 |
| (mixed with cooled gum base) | 30 |
| Xylitol liquid | 8 |
| Hydrolyzed cereal solids | 5 |
| Citric acid | 0.5 |
| Fumaric acid | 2.5 |
| Flavor oil | 0.8 |
| Flavor, spray dried | 2 |

The gum base is added to a steam jacketed kettle equipped with a sigma blade mixer. The base is melted and adjusted to a temperature of about 180° F. to 200° F.

About one-half of the sugar is thoroughly mixed into the melted gum base (while the gum base is folding well) for about 3 minutes so as to disperse the sugar throughout the continuous mass of gum base. The sugar is thereby trapped in or otherwise protected by the gum base.

Thereafter, the fumaric acid is added with mixing for about 30 seconds, and the liquid flavor is added with mixing for about 1 minute. The remaining sugar is added with mixing for about 2 minutes thereby causing the mass to be torn apart into discrete pieces. The hydrolyzed cereal solids and liquid xylitol are added to the discrete pieces of gum base with mixing for about 2 minutes, and the citric acid and spray dried flavor are added with mixing for about 2 minutes. The mass, now smooth and continuous, is removed from the kettle, rolled, scored and cut into chewing gum sticks.

The chewing gum produced has excellent sweat resistance and sweetness which lasts up to 6 to 8 minutes which is about twice as long as conventional sugar containing chewing gum prepared by adding all of the sugar to the gum mass after sugar solubilizing materials have been added thereto.

EXAMPLE 6

A flavored chewing gum having the following composition, in accordance with the present invention, is prepared as described below.

|  | Parts by Weight |
|---|---|
| Gum base | 20 |
| Sugar (dispersed in melted gum base) | 30 |
| (mixed with cooled gum base) | 30 |
| Sorbitol liquid | 8 |
| Malto dextrin | 5 |
| Flavor oil | 1 |

-continued

| | Parts by Weight |
|---|---|
| Flavor, spray dried | 0.5 |

The gum base is added to a steam jacketed kettle equipped with a sigma blade mixer. The base is melted and adjusted to a temperature of about 180° F. to 200° F.

About one-half of the sugar is thoroughly mixed into the melted gum base (while the gum base is folding well) for about 3 minutes to disperse the sugar throughout the continuous mass of gum base. The sugar is thereby trapped in or otherwise protected by the gum base.

Thereafter, the liquid flavor is added with mixing for about 1 minute. The remaining sugar is added with mixing for about 2 minutes thereby causing the mass to be torn apart into discrete pieces. Malto dextrin and liquid sorbitol are added to the discrete pieces of gum base with mixing for about 2 minutes and spray dried flavor is added with mixing for about 2 minutes. The mass, now smooth and continuous, is removed from the kettle, rolled, scored and cut into chewing gum sticks.

The chewing gum produced has excellent sweat resistance and sweetness which lasts up to 8 minutes which is about twice as long as conventional sugar containing chewing gum prepared by adding all of the sugar to the gum mass after all sugar solubilizing materials have been added thereto.

EXAMPLE 7

A flavored chewing gum having the following composition, in accordance with the present invention, is prepared as described below.

| | Parts by Weight |
|---|---|
| Gum base | 20 |
| Sugar (dispersed in melted gum base) | 30 |
| (mixed with cooled gum base) | 30 |
| Lycasin Syrup (reduced corn syrup solids as described in Reissue 26,959) | 8 |
| Flavor oil | 1 |
| Flavor, spray dried | 0.5 |

The gum base is added to a steam jacketed kettle equipped with a sigma blade mixer. The base is melted and adjusted to a temperature of about 180° F. to 200° F.

About one-half of the sugar is thoroughly mixed into the melted gum base (while the gum base is folding well) for about 3 minutes to disperse the sugar throughout the continuous mass of gum base. The sugar is thereby trapped in or otherwise protected by the gum base.

Thereafter, the liquid flavor is added with mixing for about 1 minute. The remaining sugar is added with mixing for about 2 minutes thereby causing the mass to be torn apart into discrete pieces. Lycasin syrup is added to the discrete pieces of gum mass with mixing for about 2 minutes, and spray dried flavor is added with mixing for about 2 minutes. The mass, now continuous and smooth, is removed from the kettle, rolled, scored and cut into chewing gum sticks.

The chewing gum produced has excellent sweat resistance and sweetness which lasts up to 6 to 7 minutes which is about twice as long as conventional chewing gum prepared by adding all of the sugar to the gum base after all sugar solubilizing materials have been added thereto.

EXAMPLE 8

The chewing gums of Examples 1 to 4 are presented to an expert chewing gum panel and the panelists are asked to compare the Examples 1 to 4 gums with control gums A to D (the Control gums A, B, C and D corresponding to the Example gums 1, 2, 3 and 4, respectively).

The control gums are prepared with corn syrup in place of polyhydric alcohol syrups and are prepared in the following manner.

The gum base is melted and mixed with lecithin and corn syrup for approximately 5 minutes. All of the powdered sugar is added and the liquid flavor mixed for 5 minutes. During the last 2 minutes of this mix the acids and spray dried flavor are added. In this type of mix the corn syrup is protected by the base in order to prevent sweating. In the Example gums of the invention, the sugar is protected by the base in order to achieve sweetness retention and sweat resistance is gained by replacing the corn syrup with polyhydric alcohol syrup.

The panel is presented with coded samples of the Examples 1 to 4 and Controls A to D gums. The testing procedure is as follows.

Panelists chew each of the gums for up to 10 minutes and rate each gum for the level of sweetness and overall flavor on a 0–8 hedonic scale. The panel scores each gum at 1, 3, 5, 7 and 10 minutes of chewing.

The scale used is described as follows:

| 0 - none | 6 - strong |
|---|---|
| 2 - slight | 8 - very strong. |
| 4 - definite | |

Average scores of Example and Control gums are summarized below in Tables I and II.

TABLE I

| | Chewing Gum Samples | | | |
|---|---|---|---|---|
| Attribute | Example 2 Lime | (Lime) Control B | Example 1 Orange | Orange Control A |
| Sweetness: | | | | |
| 1 min. | 5.0 | 5.2 | 4.8 | 5.4 |
| 3 min. | 4.0 | 3.6 | 3.4 | 3.2 |
| 5 min. | 3.0 | 2.8 | 2.6 | 2.0 |
| 7 min. | 2.4 | 1.8 | 2.0 | 1.6 |
| 10 min. | 1.8 | 1.0 | 1.6 | 1.2 |
| Overall Flavor | | | | |
| 1 min. | 5.8 | 5.2 | 5.2 | 5.2 |
| 3 min. | 4.4 | 4.0 | 4.2 | 3.6 |
| 5 min. | 4.0 | 3.2 | 3.4 | 2.6 |
| 7 min. | 3.0 | 2.2 | 2.4 | 2.0 |
| 10 min. | 2.6 | 1.6 | 2.2 | 1.8 |

TABLE II

| | Chewing Gum Samples | | | |
|---|---|---|---|---|
| Attribute | Example 3 Lemon | Lemon Control C | Example 4 Cherry | Control D |
| Sweetness: | | | | |
| 1 min. | | | 5.6 | 6.0 |
| 3 min. | | | 4.6 | 3.8 |
| 5 min. | | | 3.2 | 2.4 |
| 7 min. | | | 2.4 | 1.8 |

TABLE II-continued

| Attribute | Chewing Gum Samples | | | |
|---|---|---|---|---|
| | Example 3 Lemon | Lemon Control C | Example 4 Cherry | Control D |
| 10 min. | | | 1.8 | 1.0 |
| Overall Flavor: | | | | |
| 1 min. | 6.2 | 5.6 | 6.4 | 5.6 |
| 3 min. | 4.6 | 4.0 | 5.4 | 3.6 |
| 5 min. | 4.0 | 3.2 | 4.2 | 2.8 |
| 7 min. | 3.4 | 2.6 | 3.2 | 2.4 |
| 10 min. | 2.6 | 1.8 | 2.6 | 1.6 |

A plot of the data on logarithmic scale paper indicates that the Examples 1 to 4 gums of the invention lose their sweetness and flavor at a slower rate than their corresponding Control gums A to D. This finding indicates that the experimental samples have longer-lasting flavor and sweetness than the controls.

Control E

An orange-flavored chewing gum of the following composition is prepared as described in Example 1:

| | Parts by Weight |
|---|---|
| Gum base | 37 |
| Sugar (dispersed in melted gum base) | 52 |
| (mixed with cooled gum base) | 52 |
| Corn syrup | 22.5 |
| Liquid orange flavor | 1 |
| Spray dried orange flavor | 0.9 |
| Citric acid | 0.9 |
| Fumaric acid | 4 |

The only differences between the Control E and the gum described in Example 1, are the replacing of the sorbitol syrup (of Example 1) by corn syrup and the Control E gum does not contain Maltrin M100, since the viscosity of corn syrup is much higher than that of sorbitol syrup so that there is no need for using thickeners.

The chewing gum prepared according to this method is sticky and results in a mass which is difficult to handle in the rolling and scoring equipment. In addition, this gum develops sweating upon storage, while the gum in Example 1 is sweat resistant.

This is indeed an unexpected result since it is known in the art that sorbitol is more hygroscopic than corn syrup; thus one would expect the corn syrup containing gum to sweat less than the gum of the invention.

EXAMPLE 9

A chewing gum containing sugar and dipotassium glycyrrhizinate having the following composition, in accordance with the present invention, is prepared as described below.

| | Parts by Weight |
|---|---|
| Gum base | 21 |
| Sugar (dispersed in melted base) | 40 |
| (mixed with cooled base) | 17 |
| Dipotassium glycyrrhizinate | 0.05 |
| Sorbitol syrup | 10 |
| Maltrin M100 | 5 |
| Lecithin | 0.8 |
| Flavor (liquid) | 1 |
| Flavor (spray dried) | 0.5 |

The gum base is added to a steam jacketed kettle equipped with a sigma blade mixer. The base is melted and adjusted to a temperature of about 180° F. to 200° F.

About 70% of the sugar and the lecithin are thoroughly mixed into the melted gum base (while the gum base is folding well) for about three (3) minutes to disperse the sugar throughout the continuous mass of gum base. The dipotassium glycyrrhizinate is added after two (2) minutes into the sugar mix. The sugar and dipotassium glycyrrhizinate are thereby trapped in or otherwise protected by the gum base. The liquid flavor is added and mixed for about one (1) minute. The remaining sugar is added with mixing for about two (2) minutes thereby causing the mass to be torn apart into discrete pieces. The Maltrin M100 and liquid sorbitol are added to the discrete pieces of gum base with mixing for about two (2) minutes and spray dried flavor added and mixed for two (2) minutes. The mass, now smooth and continuous, is removed from the kettle, rolled, scored and cut into chewing gum sticks.

The Example 9 chewing gum is presented to an expert panel and the panelists are asked to compare the Example 9 gum with Control gum F. Control gum F is a commercial peppermint gum prepared as described in Example 8.

Panelists are given each of the two gums (coded in double digit random numbers) in one session. They are asked to chew one gum for five minutes and to keep the bolus in a paper cup. The second gum is then chewed for five minutes and is placed in a paper cup. Judges are then provided with crackers and water to remove residual flavor from the oral cavity. This rest period lasts for one minute. Judges are then asked to compare each of the boluses for:

Sweetness
Overall flavor.

This same procedure is repeated and an evaluation of each of the gums is obtained after 7, 10, 15 and 20 minutes.

The rating scale employed is a 0 to 8 hedonic scale as follows:

Sweetness and Overall Flavor

8—Very strong
6—Strong
4—Definite
2—Perceptible
0—None.

The average scores are given in Table III below.

TABLE III

| Gum | Attribute | Time (Minutes) | | | | |
|---|---|---|---|---|---|---|
| | | 5 | 7 | 10 | 15 | 20 |
| Example 9 | Sweetness | 5.0* | 4.0* | 2.6* | 1.6 | 1.2 |
| | Overall Flavor | 5.0* | 3.8* | 2.4 | 2.0 | 1.4 |
| Commercial Peppermint (Control F) | Sweetness | 4.0 | 2.4 | 1.4 | 1.0 | 0.6 |
| | Overall Flavor | 4.2 | 2.6 | 2.0 | 1.4 | 1.2 |

*Denotes significance at the 95% or higher confidence level.

The data indicates that the Example 9 gum (containing dipotassium glycyrrhizin) has significantly longer lasting sweetness and overall flavor than the commercial peppermint gum (Control F).

EXAMPLE 10

A chewing gum containing sugar, dipotassium glycyrrhizinate and xylitol having the following composition, in accordance with the present invention, is prepared as described below.

| Ingredients | Parts by Weight |
|---|---|
| Gum base | 26 |
| Sorbitol syrup | 10 |
| Maltrin M100 | 5 |
| Sugar | 47 |
| Flavor oil syrup 4:1 | 1 |
| Flavor (spray dried) | 0.5 |
| Yelkin | 0.8 |
| Dipotassium glycyrrhizinate | 0.05 |
| Xylitol | 10 |

The gum base is added to a steam jacketed kettle equipped with a sigma blade mixer. The base is melted and adjusted to a temperature of about 180° F. and 200° F.

About 70% of the sugar and the lecithin are thoroughly mixed into the melted gum base (while the gum base is folding well) for about three (3) minutes to disperse the sugar throughout the continuous mass of gum base. The dipotassium glycyrrhizinate is added after two (2) minutes into the sugar mix. The sugar and dipotassium glycyrrhizinate are thereby trapped in or otherwise protected by the gum base. The liquid flavor is added and mixed for about one (1) minutes. The remaining sugar is added with mixing for about two (2) minutes thereby causing the mass to be torn apart into discrete pieces. The Maltrin M100 and liquid sorbitol are added to the discrete pieces of gum base with mixing for about two (2) minutes and spray dried flavor and xylitol added and mixed for two (2) minutes. The mass, now smooth and continuous, is removed from the kettle, rolled, scored and cut into chewing gum sticks.

The chewing gum produced has excellent sweat resistance and sweetness which lasts up to 10 to 12 minutes.

EXAMPLE 11

A sugar containing chewing gum is prepared from the following ingredients:

|  | Parts by Weight |
|---|---|
| Gum base | 22 |
| Sorbitol powder | 10 |
| Sugar | 49 |
| Sorbitol syrup | 17 |
| Softener (lecithin) | 0.2 |
| Flavor | 1.8 |
| Sodium saccharin (150 microns or less) | 1.0 |

The gum base is melted (175°–185°) and placed in a standard dough mixer equipped with sigma blades. Sodium saccharin is thoroughly mixed into the gum base. Flavor and lecithin are added and mixed for 3 minutes. Thereafter, while the mix is a continuous mass and folding well, sugar is added and mixed for 2½ minutes followed by the addition of solid sorbitol. The mix is torn up into discrete pieces during mixing. The sorbitol syrup is added and mixing is continued for about 3 minutes. After a total mixing time of 8–10 minutes, the mixer is stopped and mixing is complete.

The chewing gum prepared above is found to have a pleasant sweet taste, which lasts for significantly longer periods than chewing gum made from the same ingredients using conventional methodology wherein corn syrup is added while the mix is continuous and is folding well.

EXAMPLES 12 TO 15

The following sugarless formulations are prepared as described below:

|  | Parts by Weight | | | |
|---|---|---|---|---|
| Ingredient | Ex. 12 | Ex. 13 | Ex. 14 | Ex. 15 |
| Gum base | 22 | 18 | 15 | 10 |
| Mannitol (2nd sweetener) | 15 | 25 | 28 | 33 |
| Sorbitol Powder (1st sweetener) | 25 | 30 | 30 | 35 |
| Flavor oil | 1 | 1 | 1 | 1 |
| Lecithin | 0.05 | 0.05 | 0.4 | 0.3 |
| Sorbitol Liquid (70% solids (aqueous softener) | 25 | 25 | 25 | 20 |

The above chewing gums are prepared by adding the required amount of gum base to a mixer as described in Example 11, melting the gum base, allowing the gum base to cool to 200° F. Mannitol is added and thoroughly mixed into the melted gum base for 3 minutes. Flavor oil and lecithin are added and mixed for 3 minutes. Thereafter, while the gum base-mannitol mix is a continuous mass and folding well, sorbitol powder is added and mixed for 3 minutes. The mix is torn up into discrete pieces during mixing. The sorbitol syrup is added and mixing is continued for about 3 minutes until the batch appears to be smooth and homogeneous.

The chewing gum prepared above including mannitol (as the second sweetener) dispersed throughout and sealed in the gum base is found to have a pleasant sweet taste. Furthermore the cud (gum base) containing the mannitol is found to have a significantly increased volume over gum base which does not include mannitol as indicated by the Table IV set out below.

TABLE IV

|  | Base Concentration | Mannitol Conc. | Cud Vol. |
|---|---|---|---|
| Control A | 27% | 0% | 1.11 ml |
| Control B | 22.5% | 0% | 0.84 ml |
| Example 12 | 22.5% | 15% | 1.00 ml |
| Example 13 | 18.0% | 25% | 0.98 ml |

EXAMPLES 16 TO 19

The following sugar-containing chewing gum formulations are prepared as described below:

|  | Parts by Weight | | | |
|---|---|---|---|---|
|  | Stick | | Other | |
|  | Ex. 16 | Ex. 17 | Ex. 18 | Ex. 19 |
| Gum base |  |  |  |  |
| Regular | 21 | — | 17 | — |
| Bubble | — | 23 | — | 19 |
| Sugar (¼ added to melted gum base) |  |  |  |  |
| (¾ mixed with cooled gum base) | 62 | 65 | 62 | 61 |
| Sorbitol syrup (70% solids) | 5 | 5 | 10 | 10 |
| Flavor oil | 0.8 | 1 | 1 | 1 |
| Lecithin | — | — | 0.2 | — |
| Maltrin M100 (malto-dextrin) | 5 | 4 | 5 | 5 |
| Granulated sugar (added as part of 2nd sweetener) | — | — | 6 | 6 |

-continued

| | Parts by Weight | | | |
|---|---|---|---|---|
| | Stick | | Other | |
| | Ex. 16 | Ex. 17 | Ex. 18 | Ex. 19 |
| Color | 0.07 | 0.1 | 0.08 | 0.08 |
| Citric acid | 0.8 | — | — | — |
| Fumaric acid | 2.5 | — | — | — |
| Flavor spray dried | — | 2 | — | — |

The above chewing gums are prepared by adding the gum base to a mixer as described in Example 11, melting the gum base, and allowing the gum base to cool to below 200° F. One-half of the powdered sugar (second sweetener) and all of the granulated sugar (where present, second sweetener) and lecithin where present are added to the gum base and mixed for 2 minutes. Flavor oil and fumaric acid where present, are added and mixed for one minute. Thereafter, while the gum base mix is continuous and folding well, the remaining sugar (first sweetener) is added and mixed for 2 minutes. During this period, the mix is torn up into discrete pieces formed of gum base containing sugar, lecithin (where present) and flavor oil dispersed therein, suspended in the remaining sugar.

Sorbitol syrup and Maltrin M100 are added to the discrete pieces of gum base suspended in the remaining sugar, with mixing for about 2 minutes. The citric acid and spray dried flavor (where present) are added with mixing for about 2 minutes. The mass, now smooth and continuous, is removed from the kettle, rolled, and cut into desired shaped pieces.

The chewing prepared as described above including sugar (as the second sweetener) dispersed throughout and sealed in the gum base is found to have a pleasant sweet taste.

EXAMPLE 20

The following sugarless formulation is prepared as described below:

| Ingredient | Parts by Weight |
|---|---|
| Gum base | 23.5 |
| Mannitol (2nd sweetener) | 10 |
| Sorbitol Powder (¼ added as 2nd sweetener to melted gum base, ¾ added as 1st sweetener to cooled gum base) | 40 |
| Flavor oil | 1 |
| Lecithin | 0.5 |
| Sorbitol Liquid (70% solids) (aqueous softener) | 24 |

The above chewing gum is prepared by adding the required amount of gum base to a mixer as described in Example 11, melting the gum base, allowing the gum base to cool to 200° F. Mannitol is added and thoroughly mixed into the melted gum base for 3 minutes. One-half of the sorbitol is added and mixed into the gum base for 3 minutes. Flavor oil and lecithin are added and mixed for 3 minutes. Thereafter, while the gum base-mannitol-sorbitol mix is a continuous mass and folding well, the remainder of the sorbitol powder is added and mixed for 3 minutes. The mix is torn up into discrete pieces during mixing. The sorbitol syrup is added and mixing is continued for about 3 minutes until the batch appears to be smooth and homogeneous.

The chewing gum prepared above including mannitol and sorbitol (as the second sweetener) dispersed throughout and sealed in the gum base is found to have a pleasant sweet taste.

EXAMPLE 21

The following sugarless formulation is prepared as described below:

| Ingredient | Parts by Weight |
|---|---|
| Gum base | 23.5 |
| Mannitol (2nd sweetener) | 40 |
| Sorbitol Powder (1st sweetener) | 24 |
| Flavor oil | 1 |
| Lecithin | 0.5 |
| Sorbitol Liquid (70% solids) (aqueous softener) | 24 |

The above chewing gum is prepared by adding the required amount of gum base to a mixer as described in Example 11, melting the gum base, allowing the gum base to cool to 200° F. Mannitol is added and thoroughly mixed into the melted gum base for 3 minutes. Flavor oil and lecithin are added and mixed for 3 minutes. Thereafter, while the gum base-mannitol mix is a continuous mass and folding well, sorbitol powder is added and mixed for 3 minutes. The mix is torn up into discrete pieces during mixing. The sorbitol syrup is added and mixing is continued for about 3 minutes until the batch appears to be smooth and homogeneous.

The chewing gum prepared above including mannitol (as the second sweetener) dispersed throughout and sealed in the gum base is found to have a pleasant sweet taste.

EXAMPLE 22

The following sugarless formulation is prepared as described below:

| Ingredient | Parts by Weight |
|---|---|
| Gum base | 23.5 |
| Sorbitol Powder (½ added to melted gum base as 2nd sweetener, ½ added to cooled gum base as 1st sweetener) | 49 |
| Flavor oil | 1 |
| Lecithin | 0.6 |
| Sorbitol Liquid (70% solids) (aqueous softener) | 24.5 |

The above chewing gum is prepared by adding the required amount of gum base to a mixer as described in Example 11, melting the gum base, allowing the gum base to cool to 200° F. One-half of the sorbitol powder is added and thoroughly mixed into the melted gum base for 3 minutes. Flavor oil and lecithin are added and mixed for 3 minutes. Thereafter, while the gum base-mannitol mix is a continuous mass and folding well, the remainder of the sorbitol powder is added and mixed for 3 minutes. The mix is torn up into discrete pieces during mixing. The sorbitol syrup is added and mixing is continued for about 3 minutes until the batch appears to be smooth and homogeneous.

The chewing gum prepared above including sorbitol (as the second sweetener) dispersed throughout and sealed in the gum base is found to have a pleasant sweet taste.

EXAMPLE 23

The following sugarless bubble gum formulation is prepared as described below:

| Ingredient | Parts by Weight |
|---|---|
| Bubble gum base | 22.5 |
| Sorbitol Powder (½ added to melted gum base as 2nd sweetener, ½ added to cooled gum base as 1st sweetener) | 50 |
| Bubble gum flavor | 1.5 |
| Lecithin | 0.5 |
| Sorbitol Liquid (70% solids) (aqueous softener) | 25 |

The above bubble gum is prepared by adding the required amount of gum base to a mixer as described in Example 11, melting the gum base, allowing the gum base to cool to 200° F. One-half of the sorbitol powder is added and thoroughly mixed into the melted gum base for 3 minutes. Flavor oil and lecithin are added and mixed for 3 minutes. Thereafter, while the gum base-mannitol mix is a continuous mass and folding well, the remainder of the sorbitol powder is added and mixed for 3 minutes. The mix is torn up into discrete pieces during mixing. The sorbitol syrup is added and mixing is continued for about 3 minutes until the batch appears to be smooth and homogeneous.

The bubble gum prepared above including sorbitol (as the second sweetener) dispersed throughout and sealed in the gum base is found to have a pleasant sweet taste.

What is claimed is:

1. A chewing gum having a prolonged sweet taste consisting essentially of a water-soluble phase consisting essentially of softener and a first sweetener in particulate form dispersed throughout the softener, and a relatively water-insoluble phase consisting essentially of a plurality of separate and distinct masses suspended in and dispersed throughout the water-soluble phase, each of said masses comprising gum base and particles of a second sweetener enveloped by said gum base, the water-soluble phase providing initial sweetness impact, while the gum base provides a protective vehicle for the second sweetener to control and slow down release of the second sweetener, thereby providing extended sweetness after the initial sweetness impact has subsided.

2. The chewing gum as defined in claim 1 wherein said first sweetener is a natural sweetener.

3. The chewing gum as defined in claim 1 wherein said second sweetener is a natural sweetener.

4. The chewing gum as defined in claim 1 wherein said first sweetener is a natural sweetener and said second sweetener is a natural sweetener.

5. The chewing gum as defined in claim 1 wherein said first sweetener comprises a sugar, a sugar alcohol or mixtures thereof, and said second sweetener comprises a sugar or sugar alcohol or mixtures thereof.

6. The chewing gum as defined in claim 5 wherein said softener comprises sorbitol syrup, maltitol syrup, xylitol, corn syrup, hydrogenated starch hydrolysate or mixtures thereof.

7. The chewing gum as defined in claim 1 wherein said second sweetener is sucrose, xylitol, mannitol, sorbitol, fructose syrup, glucose, glucyrrhizin, monoammonium salt of glycyrrhizin, calcium salt of glycyrrhizin, mono-, di- or tri-sodium salt of glycyrrhizin, mono-, di- or tri-potassium salt of glycyrrhizin, calcium saccharin, sodium saccharin, ammonium saccharin, dihydrochalcones, neohesperidin dihydrochalcone, aspartame, cyclamate salts, *Stevia rebaudiana, Richardella dulcifica, Dioscoreophyllum cumminsii,* and mixtures thereof.

8. The chewing gum as defined in claim 5 wherein said natural sweetener further includes xylitol.

9. The chewing gum as defined in claim 1 wherein said gum base is employed in a weight ratio to the aqueous softener of not less than 0.3:1.

10. The chewing gum as defined in claim 5 wherein said second sweetener comprises from about 20 to about 80% by weight of the total sugar concentration.

11. The chewing gum as defined in claim 10 wherein said second sweetener comprises from about 40 to about 60% by weight of the total sugar concentration.

12. The chewing gum as defined in claim 4 wherein said natural sweetener is present in an amount within the range of from about 50 to about 80% by weight of said chewing gum and said gum base is present in an amount within the range of from about 10 to about 40% by weight of said chewing gum.

13. The chewing gum as defined in claim 1 wherein said softener is sorbitol syrup.

14. The chewing gum as defined in claim 1 wherein said first sweetener is mannitol.

15. The chewing gum as defined in claim 14 wherein said sweetener is sorbitol syrup and said second sweetener is powdered sorbitol.

16. The chewing gum as defined in claim 14 wherein said first sweetener further comprises powdered sorbitol.

17. The chewing gum as defined in claim 1 wherein said gum base is present in an amount within the range of from about 12 to about 25% by weight of the chewing gum.

18. The chewing gum as defined in claim 1 wherein said softener is present in an amount within the range of from about 2 to about 30% by weight of said chewing gum.

19. The chewing gum as defined in claim 18 further including one or more thickeners for said aqueous softener.

20. The chewing gum as defined in claim 19 wherein said thickener is malto-dextrin, hydrolyzed cereal solids, modified food starch, low D.E. corn syrup solids, alginates, carrageenan, xanthan gum, gelatin, carob, tragacanth, locust bean or other water-soluble gums.

21. The chewing gum as defined in claim 1 further including one or more food acids.

22. The chewing gum as defined in claim 21 wherein said food acid is fumaric acid, citric acid, malic acid, tartaric acid, or mixtures thereof.

23. The chewing gum as defined in claim 1 wherein said first sweetener is sorbitol powder, said softener is sorbitol syrup, and said second sweetener is mannitol, sorbitol or mixtures thereof.

24. The chewing gum as defined in claim 1 wherein said first sweetener is sucrose, said softener is sorbitol syrup and said second sweetener is sucrose.

25. The chewing gum as defined in claim 1 further including malto-dextrin as a binder.

26. The chewing gum as defined in claim 1 including sugar as a sweetener and wherein said water-soluble phase comprises from about 23 to about 80% by weight of the chewing gum, and said water-insoluble phase comprises from about 20 to about 75% by weight of the chewing gum.

27. The chewing gum as defined in claim 26 wherein said first sweetener is present in an amount within the range of from about 20 to about 60% by weight of the chewing gum, and said second sweetener is present in an amount within the range of from about 20 to about 45% by weight of the chewing gum.

28. The chewing gum as defined in claim 1 wherein said chewing gum is a sugarless gum and said water-soluble phase comprises from about 50 to about 92% by weight of the chewing gum, and said water-insoluble phase comprises from about 8 to about 50% by weight of the chewing gum.

29. The chewing gum as defined in claim 28 wherein said first sweetener is present in an amount within the range of from about 25 to about 35% by weight of the chewing gum, and said second sweetener is present in an amount with the range of from about 15 to about 35% by weight of the chewing gum.

30. A method for forming a chewing gum as defined in claim 1 which comprises interdispersing in melted gum base particles of a second sweetener to form a continuous phase, and thereafter mixing the continuous phase with a first sweetener causing the continuous phase to be torn into discrete masses of gum base enveloping said particles of second sweetener and mixing aqueous softener with the mixture of said discrete masses and first sweetener to form a chewing gum which is smooth and continuous.

31. The method as defined in claim 30 including the step of adding malto-dextrin with said aqueous softener.

32. The chewing gum as defined in claim 1 including an outer edible sugar containing or sugarless shell.

33. The chewing gum as defined in claim 1 wherein said second sweetener comprises the free acid form of saccharin.

34. The chewing gum as defined in claim 1 having a short nougat-like discontinuous structure.

35. A chewing gum having a prolonged sweet taste and a short nougat structure said chewing gum consisting essentially of a water-soluble phase consisting essentially of softener and a first sweetener dispersed throughout the softener, and a relatively water-insoluble phase consisting essentially of a plurality of separate and distinct masses suspended in and dispersed throughout the water-soluble phase, each of said masses comprising gum base and particles of a second sweetener enveloped by said gum base, the water-soluble phase providing initial sweetness impact, while the gum base provides a protective vehicle for the second sweetener to control and slow down release of the second sweetener, thereby providing extended sweetness after the initial sweetness impact has subsided, said gum base having a soft nougat discontinuous structure which is easily torn apart.

* * * * *

UNITED STATES PATENT AND TRADEMARK OFFICE
CERTIFICATE OF CORRECTION

PATENT NO. : 4,217,368
DATED : August 12, 1980
INVENTOR(S) : Frank Witzel et al.

It is certified that error appears in the above–identified patent and that said Letters Patent are hereby corrected as shown below:

Column 3, line 65, "water-soluble" should read
--water-insoluble--.
Column 4, line 62, after "gelatin" and before "carob" insert a comma.
Column 7, line 23, "that" should read --than--.
Column 14, line 33, "gun" should read --gum--.

Signed and Sealed this

Thirtieth Day of December 1980

[SEAL]

Attest:

SIDNEY A. DIAMOND

Attesting Officer

Commissioner of Patents and Trademarks